(12) United States Patent
Ahn et al.

(10) Patent No.: US 9,720,513 B2
(45) Date of Patent: Aug. 1, 2017

(54) APPARATUS AND METHOD FOR RECEIVING A KEY INPUT

(71) Applicant: Korea Electronics Technology Institute, Seongnam-si, Gyeonggi-do (KR)

(72) Inventors: Yang Keun Ahn, Seoul (KR); Kwang Mo Jung, Goyang-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 21 days.

(21) Appl. No.: 14/803,279

(22) Filed: Jul. 20, 2015

(65) Prior Publication Data
US 2016/0274667 A1    Sep. 22, 2016

(30) Foreign Application Priority Data
Mar. 18, 2015 (KR) .......................... 10-2015-0037440

(51) Int. Cl.
| | |
|---|---|
| *G06F 3/01* | (2006.01) |
| *G06F 3/03* | (2006.01) |
| *G06F 3/042* | (2006.01) |
| *G06F 3/0488* | (2013.01) |

(52) U.S. Cl.
CPC ............ *G06F 3/017* (2013.01); *G06F 3/0304* (2013.01); *G06F 3/0426* (2013.01); *G06F 3/04886* (2013.01)

(58) Field of Classification Search
CPC . G06F 3/01; G06F 3/011; G06F 3/014; G06F 3/017; G06F 3/048–3/0482; G06F 3/0487–3/04886; G06F 3/0489–3/04897; G06F 2203/0331; G06K 9/00335–9/00355
See application file for complete search history.

(56) References Cited

U.S. PATENT DOCUMENTS

| | | | |
|---|---|---|---|
| 8,819,812 B1 * | 8/2014 | Weber ..................... | G06F 3/017 726/18 |
| 2011/0138285 A1 * | 6/2011 | Kuo ........................ | G06F 3/017 715/863 |

(Continued)

FOREIGN PATENT DOCUMENTS

| | | |
|---|---|---|
| JP | 2014165660 A | 9/2014 |
| JP | 2014-225145 A | 12/2014 |

(Continued)

OTHER PUBLICATIONS

Korean Intellectual Property Office, Communication dated Mar. 21, 2016, issued in corresponding Korean Application No. 10-2015-0037440.

*Primary Examiner* — Nathan Danielsen
(74) *Attorney, Agent, or Firm* — Sughrue Mion, PLLC

(57) ABSTRACT

Provided are an apparatus and method for inputting a character The apparatus includes a recognition unit configured to measure lengths from arbitrary points on a user's hands to respective fingertips and recognize a click gesture using the measured lengths, a control unit configured to control character input according to the recognized click gesture, and a display unit configured to display a character pad for the character input and display a character input according to the click gesture recognized on the character pad.

2 Claims, 5 Drawing Sheets

(56) References Cited

U.S. PATENT DOCUMENTS

| | | | | |
|---|---|---|---|---|
| 2012/0068917 A1* | 3/2012 | Huang | ................... | G06F 3/017 |
| | | | | 345/156 |
| 2013/0057469 A1* | 3/2013 | Ajika | ..................... | G06F 3/017 |
| | | | | 345/156 |
| 2015/0177842 A1* | 6/2015 | Rudenko | ................. | G06F 3/017 |
| | | | | 345/156 |

FOREIGN PATENT DOCUMENTS

| KR | 1020100041464 A | 4/2010 |
|---|---|---|
| KR | 101404018 B1 | 6/2014 |

* cited by examiner

APPARATUS AND METHOD FOR RECEIVING A KEY INPUT

CROSS-REFERENCE TO RELATED APPLICATION

This application claims priority to and the benefit of Korean Patent Application No. 2015-0037440, filed on Mar. 18, 2015, the disclosure of which is incorporated herein by reference in its entirety.

BACKGROUND

1. Field of the Invention

The present invention relates to character input technology, and more particularly, to an apparatus for recognizing a user's hand gesture of touching a space through a camera and inputting a character according to the recognized hand gesture and a method of inputting a character using the apparatus.

2. Discussion of Related Art

As use of information equipment has become commonplace in present-day society with the development of computer information technology, the importance of natural interaction between information equipment and users is on the rise.

Accordingly, information equipment using a text-oriented interface is being developed to use various movements of a user. A touch screen is a typical device for using movements of a user, and is widely used in smart phones, tablet personal computers (PCs), games, and so on.

According to implementation principles and operation methods, existing touch screens are classified into various types, such as a resistive (decompression) type, a capacitive type, an infrared type, and an ultrasonic type. Specifically, in the case of the resistive type, a touch input can be made using a finger or an electronic pen, but there are disadvantages of poor screen clarity and vulnerability to impact.

In the case of the capacitive type, an input can be made even by slightly touching the screen. However, it is impossible to make an input with a material that does not induce electrons, unlike a finger, and the touch screen is highly likely to malfunction due to minor damage. In addition, the infrared type, the ultrasonic type, etc. have problems of high cost and low durability, and thus show a low degree of utilization.

In addition to these existing problems, a screen positioned on a high place or a screen gradually increasing in size results in an untouchable region of the screen in which information cannot be input because it is not possible to touch the region with a hand. To solve this problem, it is necessary to develop a system that can recognize a hand gesture of a user without a direct touch of a hand of the user or an additional mechanical input device and thus can be remotely controlled.

SUMMARY OF THE INVENTION

The present invention is directed to providing an apparatus for recognizing a user's hand gesture of touching a space through a camera and inputting a character according to the recognized hand gesture, and a method of inputting a character using the apparatus.

According to an aspect of the present invention, there is provided an apparatus for inputting a character, the apparatus including: a recognition unit configured to measure lengths from arbitrary points on a user's hands to respective fingertips, and recognize a click gesture using the measured lengths; a control unit configured to control character input according to the recognized click gesture; and a display unit configured to display a character pad for the character input, and display a character input according to the click gesture recognized on the character pad.

The recognition unit may set a threshold for distinguishing the click gesture, and recognize the click gesture using the set threshold and lengths from the arbitrary points to the respective fingertips before and when the click gesture is made.

The recognition unit may determine that the click event has occurred when a difference between a length from an arbitrary point to a fingertip before the click gesture is made and an average of ratios of the lengths from the arbitrary points to the respective fingertips when the click gesture is made to the lengths from the arbitrary points to the respective fingertips before the click gesture is made exceeds the threshold.

According to another aspect of the present invention, there is provided a method of inputting a character, the method including: measuring lengths from arbitrary points on a user's hands to respective fingertips; recognizing a click gesture using the measured lengths; controlling character input according to the recognized click gesture; displaying a character pad for the character input; and displaying a character input according to the click gesture recognized on the character pad.

The recognizing of the click gesture may include: setting a threshold for distinguishing the click gesture; and recognizing the click gesture using the set threshold and lengths from the arbitrary points to the respective fingertips before and when the click gesture is made.

The recognizing of the click gesture using the set threshold and the lengths from the arbitrary points to the respective fingertips before and when the click gesture is made may include: determining whether or not a difference between a length from an arbitrary point to a fingertip before the click gesture is made and an average of ratios of the lengths from the arbitrary points to the respective fingertips when the click gesture is made to the lengths from the arbitrary points to the respective fingertips before the click gesture is made exceeds the threshold; and determining that the click gesture has occurred when the difference exceeds the threshold.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Advantages and features of the present invention and a method of achieving the same will be more clearly understood from embodiments described below in detail with reference to the accompanying drawings.

However, the present invention is not limited to the following embodiments and may be implemented in various different forms. The embodiments are provided merely for complete disclosure of the present invention and to fully convey the scope of the invention to those of ordinary skill in the art to which the present invention pertains. The present invention is defined only by the scope of the claims.

Meanwhile, the terminology used herein is for describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated components, steps, operations, and/or elements, but do not preclude the presence or addition of one or more other components, steps, operations, and/or elements.

Hereinafter, exemplary embodiments of the present invention will be described in detail with reference to the accompanying drawings.

Figure 1:
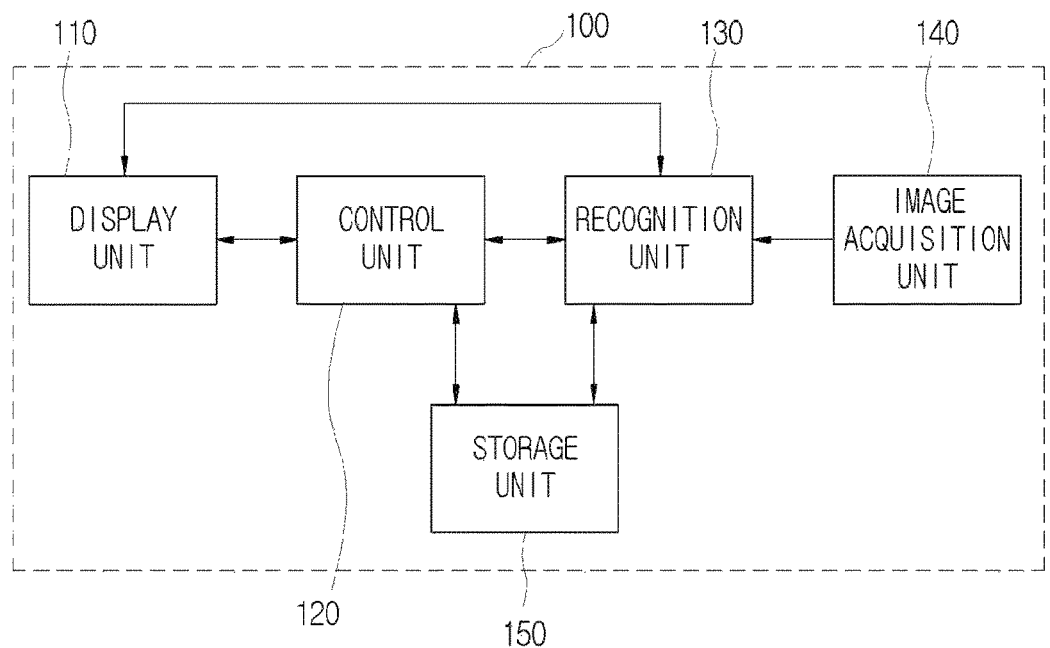
FIG. 1 is a block diagram showing a configuration of an apparatus for inputting a character according to an exemplary embodiment of the present invention.
Figure 2:
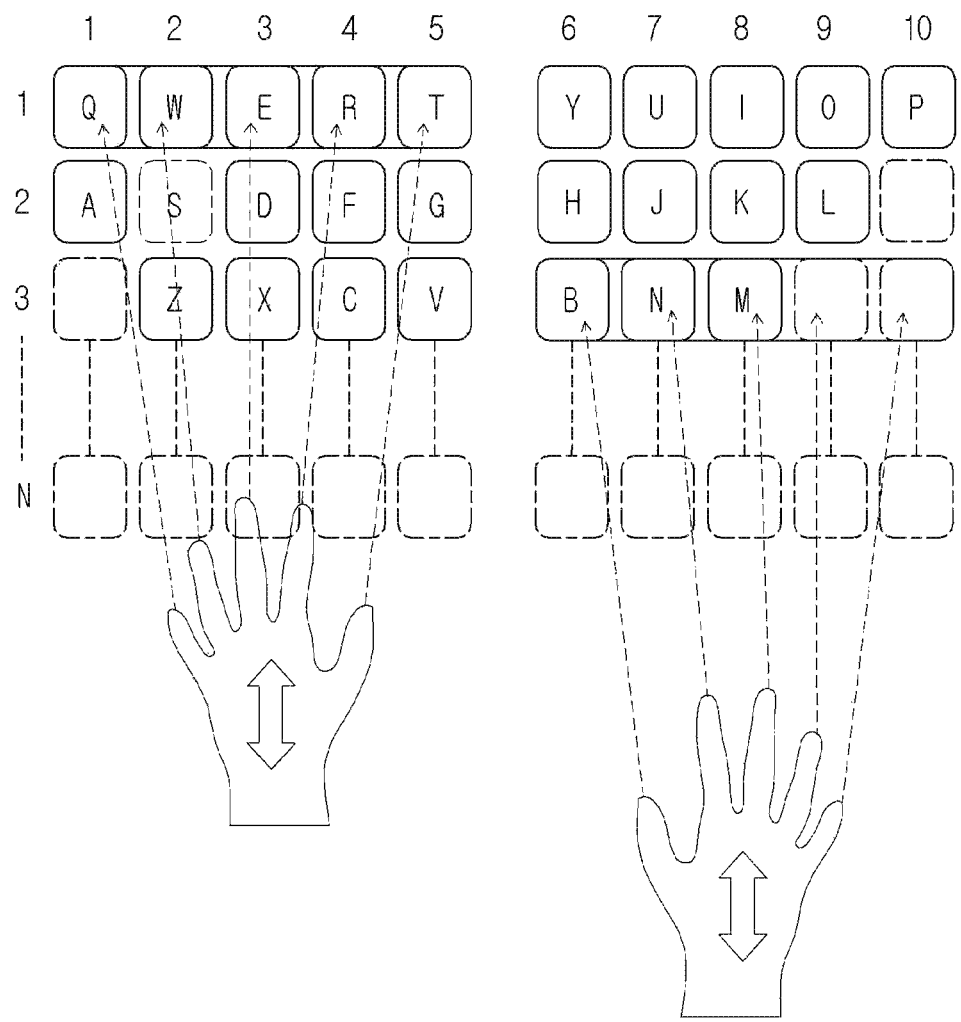
FIG. 2 is a diagram showing a character pad displayed by a display unit shown in FIG. 1.
Figure 3:
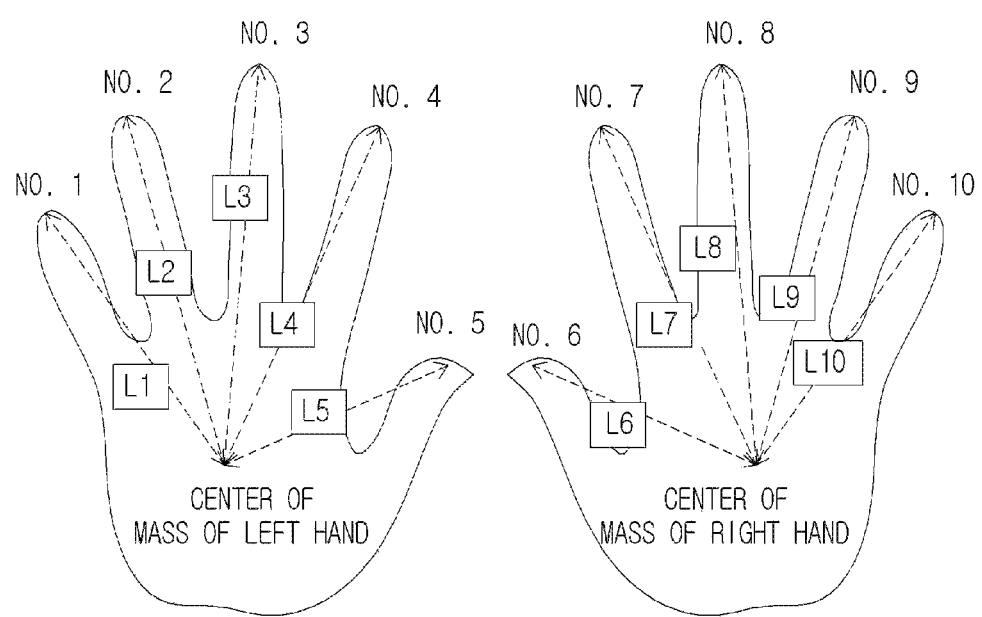
FIG. 3 is a diagram illustrating a method for a recognition unit shown in FIG. 1 to recognize a click gesture.

FIG. 1 is a block diagram showing a configuration of an apparatus for inputting a character according to an exemplary embodiment of the present invention. FIG. 2 is a diagram showing a character pad displayed by a display unit shown in FIG. 2, and FIG. 3 is a diagram illustrating a method for a recognition unit shown in FIG. 1 to recognize a click gesture.

As shown in FIG. 1, an apparatus 100 for inputting a character according an exemplary embodiment of the present invention includes a display unit 110, a control unit 120, a recognition unit 130, an image acquisition unit 140, and a storage unit 150.

The recognition unit 130 recognizes a click gesture of a user in an image captured by the image acquisition unit 140.

The control unit 120 controls character input according to the click gesture recognized by the recognition unit 130.

The display unit 110 displays a character pad for character input to the user, and displays a character input to the character pad.

The storage unit 150 stores values measured by the recognition unit 130 and information required for the control unit 120 to control character input.

An operation process of the aforementioned units will be described in detail below with reference to FIGS. 2 and 3.

As shown in FIG. 2, the display unit 110 displays a character pad having a plurality of layers, each having 10 buttons which are horizontally disposed. Here, 10 buttons that are horizontally displayed on the character pad correspond to 10 fingers, and the number of layers of the character pad may be changed according to the type of characters. For example, a character pad for inputting 26 English characters may have three layers.

The control unit 120 distinguishes a layer in which a button to be input by the user is disposed from among the plurality of layers displayed by the display unit 110 according to a forward or backward movement of a user hand, and inputs the corresponding character according to a click gesture recognized by the recognition unit 130.

For example, the control unit 120 recognizes a position change of the user hand in an image captured by the image acquisition unit 140, and activates the layer in which the button to be input by the user is disposed based on the recognized position change. For example, a first position of the user hand calculated in the captured image is used as a reference position, and a previously set reference layer (e.g., a second layer) is activated at the reference position. When the user hand moves in a first direction, the control unit 120 recognizes a first position change resulting from the first-directional movement, and activates a layer corresponding to the first position change.

For example, when the user hand moves upward from the reference position, an upward position change occurs, and accordingly, a first layer positioned above the reference layer (the second layer) is activated instead of the second layer. On the other hand, when user hand moves downward from the reference position, a downward position change occurs, and accordingly, a third layer positioned below the reference layer (the second layer) is activated instead of the second layer.

Also, the control unit 120 compares a positional change amount of the user hand with a previously set reference change amount, and when the comparison result indicates that the positional change amount exceeds the reference change amount, an activated layer is changed. At this time, the control unit 120 displays the activated layer to be distinguished from other layers through the display unit 110. For example, the activated layer may be highlighted or shaded.

Therefore, while looking at an activated layer that is distinctively displayed, the user may select a layer to use by moving the position of his or her hand.

In an example, the control unit 120 may only compare the positional change amount of the user hand with the reference change amount, and when the comparison result indicates that the positional change amount exceeds the reference change amount, the control unit 120 may recognize the positional change as the occurrence of an event and change an activated layer by one layer upward or downward from the currently activated layer. In other words, the difference between the positional change amount of the user hand and the reference change amount is not taken into consideration, and when the comparison result indicates that the positional change amount exceeds the reference change amount, a layer positioned one layer above or below the currently activated layer is activated.

In another example, the control unit 120 may compare the positional change amount of the user hand with the reference change amount, and when the comparison result indicates that the positional change amount exceeds the reference change amount, the control unit 120 may calculate the difference between the positional change amount and the reference change amount and select an activated layer according to the difference. For example, when the difference between the positional change amount and the reference change amount is "10," a layer positioned one layer above or below the currently activated layer may be activated, and when the difference is "20," a layer positioned two layers above or below the currently activated layer may be activated.

Meanwhile, a change of an activated layer resulting from a positional change of a user hand is separately made with each of the right hand and the left hand. Therefore, the user may activate a layer positioned below the reference layer by moving his or her left hand downward and simultaneously activate a layer positioned above the reference layer by moving his or her right hand upward.

The recognition unit 130 sets a threshold T for distinguishing a click gesture of the user. The threshold T may be calculated using the difference between an original finger length of the user and the length of the finger when the user bends the finger to input a button displayed in the character pad.

Therefore, the recognition unit 130 may set a value calculated differently according to a finger length of the user as the threshold T, or set an average calculated from a plurality of experimental values as the threshold T.

When the threshold T for distinguishing a click gesture of the user is set, the recognition unit 130 assigns 10 unique numbers to the 10 fingers of the user, and measures lengths L1original to L10original from arbitrary points on both hands of the user to respective fingertips. Here, the arbitrary points may be the centers of mass of the palms.

Specifically, as shown in FIG. 3, the recognition unit 130 sequentially assigns numbers from 1 to 5 to five fingers from the left little finger of the user to the left thumb, and measures a length L1original from the center of mass of the left palm to the left little fingertip, a length L2original from the center of mass to the left ring fingertip, . . . , and a length L5original from the center of mass to the tip of the left thumb.

Also, the recognition unit 130 sequentially assigns numbers from 6 to 10 to five fingers from the right thumb of the user to the right little finger, and measures a length L6original from the center of mass of the right palm to the tip of the right thumb, a length L7original from the center of mass to the right index fingertip, . . . , and a length L10original from the center of mass to the right little fingertip.

When the initial lengths to the fingertips of the user are measured, the recognition unit 130 measures current lengths L1current to L10current to the fingertips of the user, calculates ratios (%) L1ratio to L10ratio of the current lengths to the initial lengths, and compares an average Lratio_average of the calculated ratios with the threshold T, thereby determining whether or not a click gesture has occurred.

For example, it is assumed that the threshold T set by the recognition unit 130 is 20%, the initial lengths L1original to L10original to the fingertips are 100 mm, the nine currently measured lengths L1current to L9current to the fingertips are each 100 mm, but the currently measured length L10current to the right little fingertip is 70 mm.

At this time, only the ratio L10ratio of the current length L10current to the initial length L10original is calculated by the recognition unit 130 to be 70% ((L10current/L10original)*100=70), and all the nine other ratios L1ratio to L9ratio are calculated by the recognition unit 130 to be 100% ((L1current/L1original)*100=100, . . . , and (L9current/L9original)*100=100).

Subsequently, the recognition unit 130 calculates the average Lratio_average ((100*9+70*1)/10=97) of the calculated ratios L1ratio to L10ratio, calculates the differences (Lratio_average−L1ratio, . . . , and Lratio_average−L10ratio) between the calculated average Lratio_average, that is, 97%, and the finger-specific ratios (%) L1ratio to L10ratio of the current length to the initial length, and compares the differences with the threshold T.

At this time, only the difference (Lratio_average−L10ratio) of the right little finger, which is 27%, exceeds the threshold T, which is 20%. Therefore, the recognition unit 130 determines that a click gesture has been made with the right little finger.

In other words, when the user clicks a button in the character pad, the length of the corresponding finger is reduced to have a difference from an initially measured finger length, and the recognition unit 130 may determine whether or not a click gesture has been made based on the difference.

As described above, according to an exemplary embodiment of the present invention, a click event of a finger is recognized not through a process of comparing a change of a finger length with a previously set threshold but through a process of comparing a change ratio of a finger length with a previously set threshold. Therefore, it is possible to reduce calculation errors which may be caused by differences between various finger lengths during a process of recognizing a click event.

Also, according to an exemplary embodiment of the present invention, whether or not a click event has occurred is determined not through a process of simply comparing a change ratio of a finger length with a previously set threshold but through a process of calculating the average of change ratios of respective finger lengths, calculating the differences between the average and the change ratios of the respective finger lengths, and comparing the differences with the previously set threshold. This is intended to reduce errors in calculation for a click event determination resulting from differences in finger length caused by the distance between the image acquisition unit 140 and a user position. In other words, when the user is close to the image acquisition unit 140, a finger length of the user is recognized to be relatively large in an image captured by the image acquisition unit 140, compared to a case in which the user is not close to the image acquisition unit 140. According to the distance between the image acquisition unit 140 and the user position, change ratios of a finger length may be calculated to be different. Therefore, when the occurrence of a click event is determined by simply comparing the change ratio of a finger length with the previously set threshold, there is a possibility that whether or not a click event has occurred is determined differently according to the distance between the image acquisition unit 140 and the user position. In other words, an exemplary embodiment of the present invention provides a method of reducing errors in determining the occurrence of a click event which may be caused by the distance between the image acquisition unit 140 and the user position by calculating the average of change ratios of respective finger lengths, calculating the differences between the average and the change ratios of the respective finger lengths, and comparing the differences with the previously set threshold.

Figure 4:
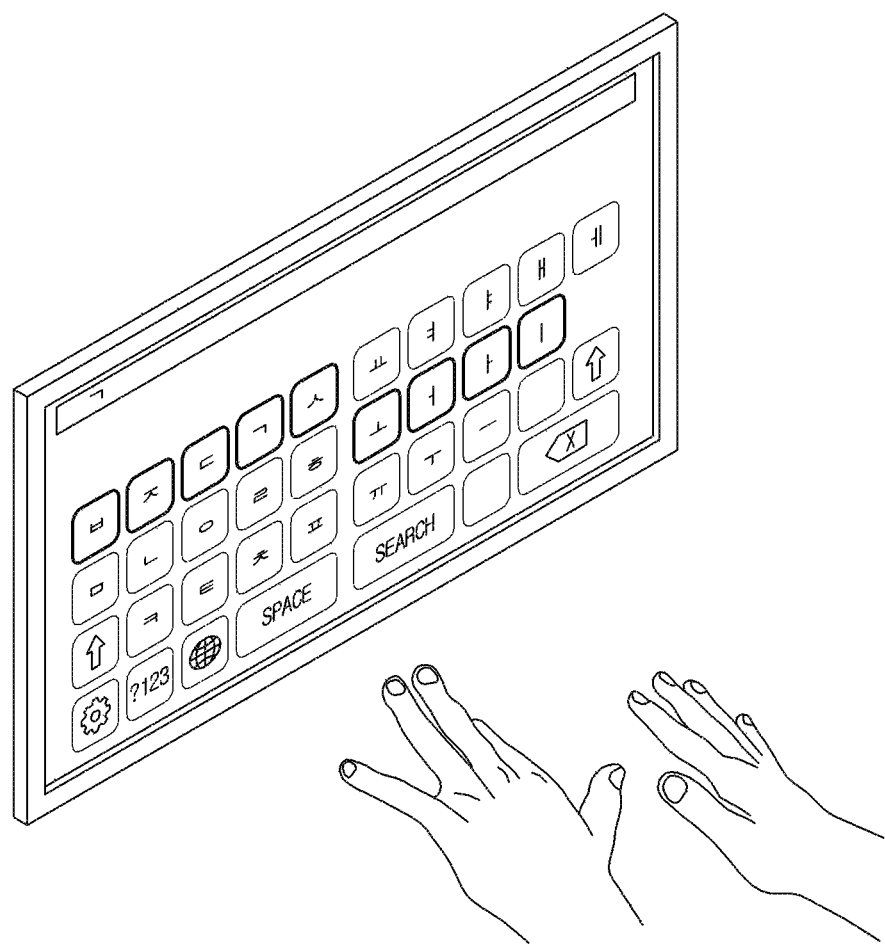
FIG. 4 shows a scene of inputting "가" according to an exemplary embodiment of the present invention.

FIG. 4 shows a scene of inputting "가" according to an exemplary embodiment of the present invention.

As shown in FIG. 4, a user may select a layer in which a character to be input is positioned by extending and moving his or her hand close to or away from a screen, and make a gesture of clicking the corresponding button, thereby inputting the character "가."

Specifically, the user may input "ㄱ" by bending and extending his or her left index finger on a first left layer and input "ㅏ" by extending his or her right middle finger on a second right layer, thereby inputting "가" finally.

Figure 5:
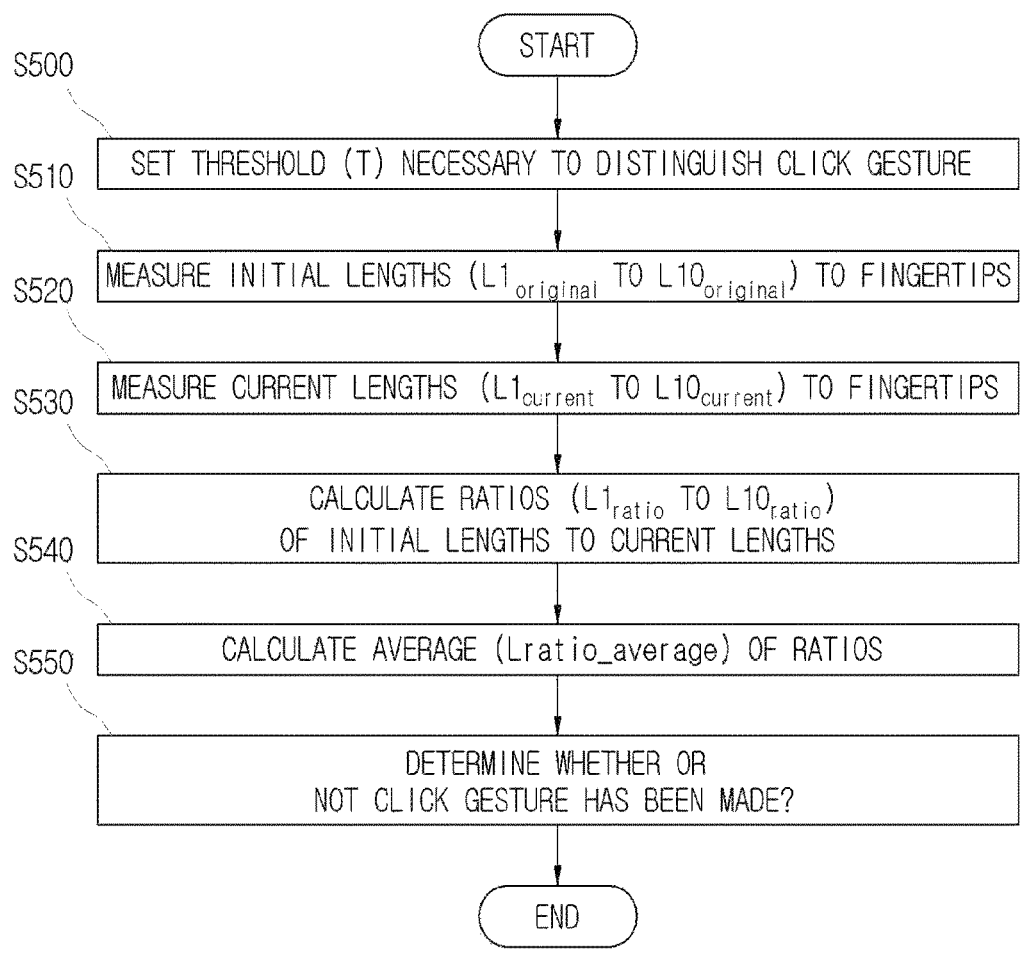
FIG. 5 is a flowchart illustrating a method of inputting a character according to an exemplary embodiment of the present invention.

FIG. 5 is a flowchart illustrating a method of inputting a character according to an exemplary embodiment of the present invention.

As shown in FIG. 5, a threshold T for distinguishing a click gesture of a user is set (S500).

The threshold T may be calculated using the difference between an original finger length of the user and the length of the corresponding finger when the user bends the finger to input a button displayed in a character pad.

Therefore, it is possible to set a value calculated differently according to a finger length of the user as the threshold T, or set an average calculated from a plurality of experimental values as the threshold T.

When the threshold T for distinguishing a click gesture of the user is set, 10 unique numbers are assigned to the 10 fingers of the user, and lengths L1original to L10original from arbitrary points on both hands of the user to respective fingertips are measured. Here, the arbitrary points may be the centers of mass of the palms (S510).

Specifically, numbers from 1 to 5 are sequentially assigned to five fingers from the left little finger of the user to the left thumb, and a length L1original from the center of mass of the left palm to the left little fingertip, a length L2original from the center of mass to the left ring fingertip, . . . , and a length L5original from the center of mass to the tip of the left thumb are measured.

Also, numbers from 6 to 10 are sequentially assigned to five fingers from the right thumb of the user to the right little finger, and a length L6original from the center of mass of the right palm to the tip of the right thumb, a length L7original from the center of mass to the right index fingertip, . . . , and a length L10original from the center of mass to the right little fingertip are measured.

When the initial lengths to the fingertips of the user are measured, current lengths L1current to L10current to the fingertips of the user are measured (S520), and ratios (%) L1ratio to L10ratio of the current lengths to the initial lengths are calculated (S530).

When the ratios L1ratio to L10ratio of the current lengths to the initial lengths are calculated, an average Lratio_average of the calculated ratios is calculated (S540), and compared with the threshold T, so that whether or not a click gesture has occurred is determined (S550).

For example, it is assumed that the set threshold T is 20%, the initial lengths L1 original to L10original to the fingertips are 100 mm, the nine currently measured lengths L1current to L9current to the fingertips are each 100 mm, but the currently measured length L10current to the right little fingertip is 70 mm.

At this time, only the ratio L10ratio of the current length L10current to the initial length L10original is calculated to be 70% ((L10current/L10original)*100=70), and all the nine other ratios L1ratio to L9ratio are calculated to be 100% ((L1current/L1original)*100=100, . . . , and (L9current/L9original)*100=100).

Subsequently, the average Lratio_average ((100*9+70*1)/10=97) of the calculated ratios L1ratio to L10ratio is calculated, and the differences (Lratio_average−L1ratio, . . . , and Lratio_average−L10ratio) between the calculated average Lratio_average, that is, 97%, and the finger-specific ratios (%) L1ratio to L10ratio of the current lengths to the initial lengths are calculated and compared with the threshold T.

At this time, only the difference (Lratio_average−L10ratio) of the right little finger, which is 27%, exceeds the threshold T, which is 20%. Therefore, it is determined that a click gesture has been made with the right little finger.

In other words, when the user clicks a button in the character pad, the length of the corresponding finger is reduced to have a difference from an initially measured finger length, and it is possible to determine whether or not a click gesture has been made based on the difference.

According to an exemplary embodiment of the present invention, a character pad having a plurality of layers, each having 10 buttons which are horizontally disposed, is displayed, and character input is controlled according to a click gesture of a user recognized on the character pad, so that a character can be input without a direct touch of the user's hand or an additional mechanical input device.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An apparatus for receiving a key input, the apparatus comprising at least one processor to implement:
    a display unit configured to display a keypad to receive the key input;
    a detection unit configured to detect a click gesture using a length from an arbitrary point on a user's hand to a fingertip; and
    a control unit configured to control the display unit to display a result of the key input according to the click gesture detected on the keypad,
    wherein the detection unit detects the click gesture based on a first ratio of the fingertip, the first ratio being of the length from the arbitrary point to the fingertip before the click gesture is made to the length from the arbitrary point to the fingertip when the click gesture is made,
    wherein the detection unit detects the click gesture further based on second ratios of two or more fingertips, the second ratios being based on lengths from the arbitrary point to the two or more fingertips before and when the click gesture is made, and
    wherein the detection unit detects the click gesture in response to a difference between the first ratio of the fingertip and an average of the second ratios of the two or more fingertips being greater than a threshold.

2. A method of receiving a key input, the method comprising:
    displaying a keypad to receive the key input;
    obtaining a length from an arbitrary point on a user's hands to a fingertip;
    detecting a click gesture based on the obtained length;
    controlling to display a result of the key input according to the click gesture detected on the keypad,
    wherein the detecting the click gesture comprises detecting the click gesture based on a first ratio of the fingertip, the first ratio being of the length from the arbitrary point to the fingertip before the click gesture is made to the length from the arbitrary point to the fingertip when the click gesture is made,
    wherein the detecting the click gesture based on the first ratio of the fingertip comprises detecting the click gesture based on the first ratio of the fingertip and based on second ratios of two or more fingertips, the second ratios being based on lengths from the arbitrary point to the two or more fingertips before and when the click gesture is made, and
    wherein the detecting the click gesture based on the first ratio of the fingertip and based on the second ratios of the two or more fingertips comprises detecting the click gesture in response to a difference between the first ratio of the fingertip and an average of the second ratios of the two or more fingertips being greater than a threshold.

* * * * *